(12) United States Patent
Nomoto

(10) Patent No.: US 11,552,291 B2
(45) Date of Patent: Jan. 10, 2023

(54) ANODE

(71) Applicant: TOYOTA JIDOSHA KABUSHIKI KAISHA, Toyota (JP)

(72) Inventor: Kazushige Nomoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 413 days.

(21) Appl. No.: 16/678,185

(22) Filed: Nov. 8, 2019

(65) Prior Publication Data

US 2020/0168904 A1     May 28, 2020

(30) Foreign Application Priority Data

Nov. 28, 2018    (JP) ............................. JP2018-222239

(51) Int. Cl.
| | |
|---|---|
| *H01M 4/38* | (2006.01) |
| *H01M 4/62* | (2006.01) |
| *H01M 10/0525* | (2010.01) |
| *H01M 10/0562* | (2010.01) |

(52) U.S. Cl.
CPC ........... *H01M 4/386* (2013.01); *H01M 4/622* (2013.01); *H01M 10/0525* (2013.01); *H01M 10/0562* (2013.01); *H01M 2300/0045* (2013.01); *H01M 2300/0065* (2013.01)

(58) Field of Classification Search
CPC .... H01M 4/36; H01M 4/622; H01M 10/0525; H01M 10/0562; H01M 2300/0045; H01M 2300/0065
See application file for complete search history.

(56) References Cited

U.S. PATENT DOCUMENTS

| | | | |
|---|---|---|---|
| 2014/0377621 A1 | 12/2014 | Hanyu et al. | |
| 2017/0062823 A1* | 3/2017 | Yamaguchi | ........... H01M 4/587 |
| 2018/0316057 A1* | 11/2018 | Sasaki | ............... H01M 10/0525 |

FOREIGN PATENT DOCUMENTS

| | | | | |
|---|---|---|---|---|
| JP | 2008-053135 A | * | 3/2008 | ............ H01M 10/36 |
| JP | 2015-216016 A | | 12/2015 | |
| JP | 2017-004910 A | | 1/2017 | |
| WO | 2013/051308 A1 | | 4/2013 | |

OTHER PUBLICATIONS

A. Orita et al., "Favorable combination of positive and negative electrode materials with glyme-Li salt complex electrolytes in lithium ion batteries", Journal of Power Sources, 2011, pp. 3874-3880, vol. 196.

\* cited by examiner

*Primary Examiner* — Osei K Amponsah
(74) *Attorney, Agent, or Firm* — Sughrue Mion, PLLC

(57) ABSTRACT

Provided is an anode configured to increase the ion conductivity of an anode layer and suppress a decrease in the energy density of the anode layer. Disclosed is an anode, wherein the anode is an anode comprising an anode layer for all-solid-state batteries; wherein the anode layer comprises an anode active material, a solid electrolyte and an ionic liquid; wherein the anode layer comprises at least one Si-based material selected from the group consisting of elemental Si and Si alloy as the anode active material; and wherein the ionic liquid is a solvated ionic liquid containing, in molar ratio, 1.5 mol or more of lithium bis(fluorosulfonyl)imide with respect to 1 mol of tetraglyme, or the ionic liquid is a solvated ionic liquid containing, in molar ratio, 2.0 mol or more of lithium bis(trifluoromethanesulfonyl)imide with respect to 1 mol of tetraglyme.

8 Claims, 1 Drawing Sheet

ANODE

TECHNICAL FIELD

The disclosure relates to an anode.

BACKGROUND

In recent years, with the rapid spread of IT and communication devices such as personal computers, camcorders and cellular phones, great importance has been attached to the development of batteries that is usable as the power source of such devices. In the automobile industry, etc., high-power and high-capacity batteries for electric vehicles and hybrid vehicles are under development.

Of all-solid-state batteries, an all-solid-state lithium ion battery has attracted attention, due to its high energy density resulting from the use of a battery reaction accompanied by lithium ion transfer, and due to the use of a solid electrolyte as the electrolyte present between the cathode and the anode, in place of a liquid electrolyte containing an organic solvent.

Patent Literature 1 discloses a secondary battery in which Si is used as an anode body.

Patent Literature 2 discloses a lithium ion secondary battery which is improved in bondability between a cathode mix layer and a solid electrolyte layer and which is reduced in internal resistance.

Patent Literature 3 discloses a thionyl chloride-lithium battery arranged to ensure that a decrease in discharge voltage is suppressed at the time of starting discharge even after having left the battery for a long time without discharge.

Patent Literature 1: International Publication No. WO2013/051308

Patent Literature 2: Japanese Patent Application Laid-Open (JP-A) No. 2017-004910

Patent Literature 3: JP-A No. 2015-216016

For an all-solid-state battery including an anode comprising an anode layer in which a Si-based material is used as an anode active material, the Si-based material is less likely to deform. Accordingly, there is the following problem: at the time of forming the anode layer, many spaces are formed between the Si-based material and other materials in the anode layer.

By filling the spaces of the anode layer with an ionic liquid, the volume percentage of the spaces in the anode layer can be decreased. However, it is problematic in that the ion conductivity of the anode layer may decrease, and the energy density of the anode layer may decrease.

In light of the above circumstances, an object of the disclosed embodiments is to provide an anode configured to increase the ion conductivity of an anode layer and suppress a decrease in the energy density of the anode layer.

In a first embodiment, there is provided an anode, wherein the anode is an anode comprising an anode layer for all-solid-state batteries; wherein the anode layer comprises an anode active material, a solid electrolyte and an ionic liquid; wherein the anode layer comprises at least one Si-based material selected from the group consisting of elemental Si and Si alloy as the anode active material; and wherein the ionic liquid is a solvated ionic liquid containing, in molar ratio, 1.5 mol or more of lithium bis(fluorosulfonyl)imide with respect to 1 mol of tetraglyme, or the ionic liquid is a solvated ionic liquid containing, in molar ratio, 2.0 mol or more of lithium bis(trifluoromethanesulfonyl)imide with respect to 1 mol of tetraglyme.

The anode of the disclosed embodiments may be an anode wherein the anode layer has spaces inside; wherein the ionic liquid is present in the spaces; and wherein a value A calculated by the following formula (1) is 8.5 or more and 27.0 or less:

$$A = x(100-y)/z \qquad \text{Formula (1)}$$

where x (mass %) is a mass percentage of the solid electrolyte contained in the anode layer, when a total mass of the anode layer is determined as 100 mass %; y (volume %) is a volume percentage of the spaces present in the anode layer, when a total volume of the anode layer is determined as 100 volume %; and z (volume %) is a volume percentage of the ionic liquid occupying the spaces, when a total volume of the spaces is determined as 100 volume %.

In another embodiment, there is provided an all-solid-state battery comprising a cathode, the anode and a solid electrolyte layer disposed between the cathode and the anode.

According to the disclosed embodiments, an anode configured to increase the ion conductivity of an anode layer and suppress a decrease in the energy density of the anode layer, can be provided.

BRIEF DESCRIPTION OF THE DRAWINGS

In the accompanying drawings.

DETAILED DESCRIPTION

Figure 1:
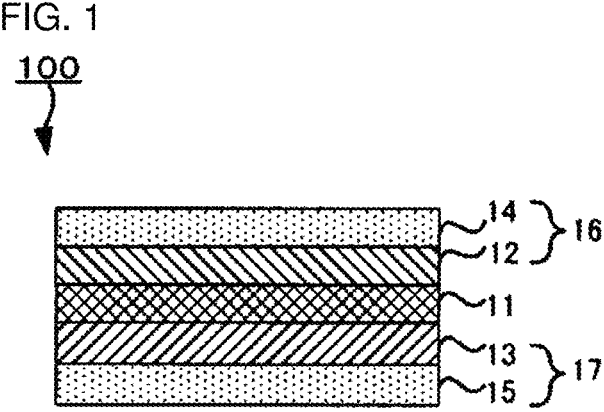
FIG. 1 is a schematic sectional view of an example of the all-solid-state battery of the disclosed embodiments.

The anode of the disclosed embodiments is an anode, wherein the anode is an anode comprising an anode layer for all-solid-state batteries; wherein the anode layer comprises an anode active material, a solid electrolyte and an ionic liquid; wherein the anode layer comprises at least one Si-based material selected from the group consisting of elemental Si and Si alloy as the anode active material; and wherein the ionic liquid is a solvated ionic liquid containing, in molar ratio, 1.5 mol or more of lithium bis(fluorosulfonyl)imide with respect to 1 mol of tetraglyme, or the ionic liquid is a solvated ionic liquid containing, in molar ratio, 2.0 mol or more of lithium bis(trifluoromethanesulfonyl)imide with respect to 1 mol of tetraglyme.

An all-solid-state battery is characterized in that all of the constituent materials (such as an active material responsible for insertion and extraction of ions and an electrolyte responsible for transfer of ions) are composed of a solid substance and spaces are present in the electrode layers. In the electrode layers, ion conduction is carried out at interfaces between the solid electrolytes and between the active materials and the solid electrolytes. Accordingly, formation of good interfaces in the electrode layer plays an important part in ensuring the ion conductivity of the electrode layers.

However, the elemental Si, which is used as an anode active material and in the form of particles, has a large Young's modulus (180 GPa) and the particles are less likely to deform. Accordingly, at the time of forming the anode layer, many spaces are formed between the elemental Si and other materials in the anode layer, making it difficult to form interfaces and decreasing in the number of ion conducting paths. As a result, the anode layer in which the elemental Si is used as the anode active material, has a low filling rate and shows low ion conduction.

To increase the ion conductivity of the anode layer, therefore, it is needed to increase the percentage of the solid electrolyte contained in the anode layer, and there is the following problem: the percentage of the anode active material contained in the anode layer is relatively decreased, and the energy density of the anode layer is decreased.

It was found that by filling the spaces of the anode layer with the predetermined ionic liquid, the ion conductivity of the anode layer can be increased without decreasing the energy density of the anode layer.

According to the disclosed embodiments, by incorporating the ionic liquid in the anode layer containing the Si-based material, sites that have been spaces and have not contributed to ion conduction, are used as ion conducting paths. As a result, the ion conductivity of the anode layer can be increased.

The reason for the increase in the ion conductivity of the anode layer is presumed as follows: by using the highly-concentrated, solvated ionic liquid, highly-polar sites in the tetraglyme are coordinated to Li ions, and a reaction between the ionic liquid and the solid electrolyte is less likely to occur, therefore.

Also according to the disclosed embodiments, due to the use of the spaces in the anode layer, the volume of the anode layer and the content of the anode active material contained in the anode layer can be the same as those of conventional anode layers. Accordingly, the energy density of the anode layer is not decreased compared to conventional anode layers.

[Anode]

The anode comprises an anode layer. As needed, the anode comprises an anode current collector.

The anode layer contains at least the anode active material, the solid electrolyte and the ionic liquid. As needed, the anode layer further contains an electroconductive material, a binder, etc.

As the anode active material, examples include, but are not limited to, at least one Si-based material selected from the group consisting of elemental Si and Si alloy.

The form of the anode active material is not particularly limited. As the form, examples include, but are not limited to, a particulate form and a thin film form. From the viewpoint of dispersibility of the anode active material in the anode layer, the anode active material may be in a particulate form.

When the anode active material is in a particulate form, the average particle diameter ($D_{50}$) of the anode active material particles may be 1 nm or more and 100 µm or less, or it may be 10 nm or more and 30 µm or less, for example.

The ionic liquid may be a solvated ionic liquid containing, in molar ratio, 1.5 mol or more (this is the lower limit and the upper limit may be 2.5 mol or less) of lithium bis (fluorosulfonyl)imide (or LiFSI as a lithium salt) with respect to 1 mol of tetraglyme (G4), or the ionic liquid may be a solvated ionic liquid containing, in molar ratio, 2.0 mol or more (this is the lower limit and the upper limit may be 2.5 mol or less) of lithium bis(trifluoromethanesulfonyl) imide (or LiTFSI as a lithium salt) with respect to 1 mol of tetraglyme (G4).

As the solid electrolyte, electroconductive material and binder contained in the anode layer, examples include, but are not limited to, those exemplified below as the solid electrolyte, electroconductive material and binder contained in a cathode layer.

When the total mass of the anode layer is determined as 100 mass %, the mass percentage (x) of the solid electrolyte contained in the anode layer may be from 1 mass % to 80 mass %, or it may be from 10 mass % to 50 mass %.

The contents of the electroconductive material and binder contained in the anode layer, are not particularly limited.

The anode layer may have spaces inside.

The ionic liquid may be present in the spaces of the anode layer.

When the total volume of the anode layer is determined as 100 volume %, the volume percentage y (volume %) of the spaces present in the anode layer may be from 5 volume % to 50 volume %, or it may be from 10 volume % to 15 volume %.

The method for calculating the volume percentage of the spaces in the anode layer, is not particularly limited. For example, it may be calculated as follows. First, an anode layer that does not contain an ionic liquid, is produced. Then, the volume percentage of spaces in the anode layer is calculated from the mass and volume of the anode layer and the specific gravity and volume of materials used to form the anode layer.

When the total volume of the spaces is determined as 100 volume %, the volume percentage z (volume %) of the ionic liquid occupying the spaces may be from 20 volume to 100 volume %, or it may be from 50 volume % to 100 volume %.

For the anode of the disclosed embodiments, the value A calculated by the following formula (1) may be 8.5 or more and 27.0 or less:

$$A = x(100-y)/z \qquad \text{Formula (1)}$$

where x (mass %) is the mass percentage of the solid electrolyte contained in the anode layer, when the total mass of the anode layer is determined as 100 mass %; y (volume %) is the volume percentage of the spaces present in the anode layer, when the total volume of the anode layer is determined as 100 volume %; and z (volume %) is the volume percentage of the ionic liquid occupying the spaces, when the total volume of the spaces is determined as 100 volume %.

The value A represents a relationship between the ion conductivity of the anode layer and the content of the ionic liquid contained in the anode layer.

The value A may be in the above range, since the ion conductivity of the anode layer can be further increased.

The method for forming the anode layer is not particularly limited. As the method, examples include, but are not limited to, pressure-forming a powdered anode mix that contains the anode active material, the solid electrolyte, the ionic liquid and, as needed, other components such as an electroconductive material and a binder. Another example of the method for producing the anode layer is as follows: an anode layer slurry containing the anode active material, the solid electrolyte, the ionic liquid, a solvent and, as needed, other components such as an electroconductive material and a binder, is prepared; the anode layer slurry is applied on one surface of a support such as the anode current collector or a solid electrolyte layer; and the applied anode layer slurry is dried, thereby forming the anode layer. As the solvent used in the anode layer slurry, examples include, but are not limited to, those exemplified below as the solvent used in a cathode layer slurry. As the method for applying the anode layer slurry to one surface of the support, examples include, but are not limited to, those exemplified below as the method for applying the cathode layer slurry.

As the anode current collector, a conventionally-known metal that is usable as a current collector in all-solid-state batteries, may be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the anode current collector is not particularly limited. As the form, examples include, but are not limited to, various kinds of forms such as a foil form and a mesh form.

The form of the whole anode is not particularly limited. It may be a sheet form. In this case, the thickness of the whole anode is not particularly limited. It can be determined depending on desired performance.

[All-Solid-State Battery]

The anode of the disclosed embodiments is for use in all-solid-state batteries.

The all-solid-state battery of the disclosed embodiments comprises a cathode, the anode and a solid electrolyte layer disposed between the cathode and the anode.

FIG. 1 is a schematic sectional view of an example of the all-solid-state battery of the disclosed embodiments. In the accompanying drawings, for ease of illustration and understanding, the components shown in the figures are appropriately scaled down, or the horizontal to vertical dimensional ratio of the components is changed from the actual ratio and exaggerated.

As shown in FIG. 1, an all-solid-state battery 100 comprises a cathode 16 comprising a cathode layer 12 and a cathode current collector 14, an anode 17 comprising an anode layer 13 and an anode current collector 15, and a solid electrolyte layer 11 disposed between the cathode 16 and the anode 17.

[Cathode]

The cathode comprises at least the cathode layer. As needed, it comprises the cathode current collector.

The cathode layer contains a cathode active material. As optional components, the cathode layer may contain a solid electrolyte, an electroconductive material, a binder, etc.

The type of the cathode active material is not particularly limited. As the cathode active material, examples include, but are not limited to, $LiCoO_2$, $LiNi_xCo_{1-x}O_2$ (0<x<1), $LiNi_{1/3}Co_{1/3}Mn_{1/3}O_2$, $LiMnO_2$, different element-substituted Li—Mn spinels (such as $LiMn_{1.5}Ni_{0.5}O_4$, $LiMn_{1.5}Al_{0.5}O_4$, $LiMn_{1.5}Mg_{0.5}O_4$, $LiMn_{1.5}Fe_{0.5}O_4$ and $LiMn_{1.5}Zn_{0.5}O_4$), lithium titanates (such as $Li_4Ti_5O_{12}$), lithium metal phosphates (such as $LiFePO_4$, $LiMnPO_4$, $LiCoPO_4$ and $LiNiPO_4$), transition metal oxides (such as $V_2O_5$ and $MoO_3$), $TiS_2$, LiCoN, Si, $SiO_2$, $Li_2SiO_3$, $Li_4SiO_4$, and lithium storage intermetallic compounds (such as $Mg_2Sn$, $Mg_2Ge$, $Mg_2Sb$ and $Cu_3Sb$).

The form of the cathode active material is not particularly limited. It may be a particulate form.

A coating layer containing a Li ion conducting oxide may be formed on the surface of the cathode active material. This is because a reaction between the cathode active material and the solid electrolyte can be suppressed.

As the Li ion conducting oxide, examples include, but are not limited to, $LiNbO_3$, $Li_4Ti_5O_{12}$ and $Li_3PO_4$.

The content of the cathode active material in the cathode layer is not particularly limited. For example, it may be in a range of from 10 mass % to 100 mass %.

As the solid electrolyte used in the cathode layer, examples include, but are not limited to, those exemplified below as the solid electrolyte used in the below-described solid electrolyte layer. The content of the solid electrolyte in the cathode layer is not particularly limited.

As the electroconductive material, a known electroconductive material may be used. As the electroconductive material, examples include, but are not limited to, a carbonaceous material and metal particles. The carbonaceous material may be at least one selected from the group consisting of carbon nanotube, carbon nanofiber and carbon blacks such as acetylene black (AB) and furnace black. Of them, from the viewpoint of electron conductivity, the electroconductive material may be at least one selected from the group consisting of carbon nanotube and carbon nanofiber. The carbon nanotube and carbon nanofiber may be vapor-grown carbon fiber (VGCF). As the metal particles, examples include, but are not limited to, particles of Ni, particles of Cu, particles of Fe and particles of SUS. The content of the electroconductive material in the cathode layer is not particularly limited.

As the binder, examples include, but are not limited to, rubber-based binders such as butadiene rubber, hydrogenated butadiene rubber, styrene-butadiene rubber (SBR), hydrogenated styrene-butadiene rubber, nitrile-butadiene rubber, hydrogenated nitrile-butadiene rubber and ethylene-propylene rubber; fluoride-based binders such as polyvinylidene fluoride (PVdF), polyvinylidene fluoride-polyhexafluoropropylene copolymer (PVDF-HFP), polytetrafluoroethylene and fluorine rubber; polyolefin-based thermoplastic resins such as polyethylene, polypropylene and polystyrene; imide-based resins such as polyimide and polyamideimide; amide-based resins such as polyamide; acrylic resins such as polymethyl acrylate and polyethyl acrylate; and methacrylic resins such as polymethyl methacrylate and polyethyl methacrylate. The content of the binder in the cathode layer is not particularly limited.

The thickness of the cathode layer is not particularly limited.

The cathode layer can be formed by a conventionally-known method.

For example, a cathode layer slurry is produced by putting the cathode active material and the binder in a solvent and mixing them. The slurry is applied on one surface of a support such as the cathode current collector. The applied slurry is dried, thereby forming the cathode layer.

As the solvent, examples include, but are not limited to, butyl acetate, butyl butyrate, heptane and N-methyl-2-pyrrolidone.

The method for applying the cathode layer slurry on one surface of the support such as the cathode current collector, is not particularly limited. As the method, examples include, but are not limited to, a doctor blade method, a metal mask printing method, an electrostatic coating method, a dip coating method, a spray coating method, a roller coating method, a gravure coating method and a screen printing method.

The cathode layer may be formed by another method such as pressure-forming a powdered cathode mix that contains the cathode active material and, as needed, other components.

As the cathode current collector, a conventionally-known metal that is usable as a current collector in all-solid-state batteries, may be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the cathode current collector is not particularly limited. As the form, examples include, but are not limited to, various kinds of forms such as a foil form and a mesh form.

The form of the whole cathode is not particularly limited. It may be a sheet form. In this case, the thickness of the whole cathode is not particularly limited. It can be determined depending on desired performance.

[Solid Electrolyte Layer]

The solid electrolyte layer contains at least a solid electrolyte.

As the solid electrolyte, examples include, but are not limited to, a sulfide-based solid electrolyte and an oxide-based solid electrolyte.

As the sulfide-based solid electrolyte, examples include, but are not limited to, $Li_2S$—$P_2S_5$, $Li_2S$—$SiS_2$, $LiX$—$Li_2S$—$SiS_2$, $LiX$—$Li_2S$—$P_2S_5$, $LiX$—$Li_2O$—$Li_2S$—$P_2S_5$, $LiX$—$Li_2S$—$P_2O_5$, $LiX$—$Li_3PO_4$—$P_2S_5$ and $Li_3PS_4$. The "$Li_2S$—$P_2S_5$" means a material composed of a raw material composition containing $Li_2S$ and $P_2S_5$, and the same applies to other solid electrolytes. Also, "X" in the "LiX" means a halogen element. The LiX contained in the raw material composition may be one or more kinds. When two or more kinds of LiX are contained in the raw material composition, the mixing ratio is not particularly limited.

The molar ratio of the elements in the sulfide-based solid electrolyte can be controlled by controlling the contents of the elements contained in raw materials. The molar ratio and composition of the elements in the sulfide-based solid electrolyte can be measured by inductively coupled plasma atomic emission spectroscopy, for example.

The sulfide-based solid electrolyte may be glass, crystal or crystalline glass ceramic.

The crystal state of the sulfide-based solid electrolyte can be confirmed by X-ray powder diffraction measurement using CuKα radiation, for example.

The glass can be obtained by amorphizing a raw material composition (such as a mixture of $Li_2S$ and $P_2S_5$). The raw material composition can be amorphized by mechanical milling, for example. The mechanical milling may be dry mechanical milling or wet mechanical milling. The mechanical milling may be the latter because attachment of the raw material composition to the inner surface of a container, etc., can be prevented.

The mechanical milling is not particularly limited, as long as it is a method for mixing the raw material composition by applying mechanical energy thereto. The mechanical milling may be carried out by, for example, a ball mill, a vibrating mill, a turbo mill, mechanofusion, or a disk mill. The mechanical milling may be carried out by a ball mill, or it may be carried out by a planetary ball mill. This is because the desired glass can be efficiently obtained.

The glass ceramic can be obtained by heating glass, for example.

The crystal can be obtained by heating glass or developing a solid state reaction of the raw material composition, for example.

For the heating, the heating temperature may be a temperature higher than the crystallization temperature (Tc) of the glass, which is a temperature observed by thermal analysis measurement. In general, it is 195° C. or more. On the other hand, the upper limit of the heating temperature is not particularly limited.

The crystallization temperature (Tc) of the glass can be measured by differential thermal analysis (DTA).

The heating time is not particularly limited, as long as the desired crystallinity is obtained. For example, it is in a range of from one minute to 24 hours, or it may be in a range of from one minute to 10 hours.

The heating method is not particularly limited. For example, a firing furnace may be used.

As the oxide-based solid electrolyte, examples include, but are not limited to, $Li_{6.25}La_3Zr_2Al_{0.25}O_{12}$, $Li_3PO_4$, and $Li_{3+x}PO_{4-x}N_x$ (LiPON).

From the viewpoint of handling, the form of the solid electrolyte may be a particulate form.

The average particle diameter ($D_{50}$) of the solid electrolyte particles is not particularly limited. The lower limit may be 0.5 μm or more, and the upper limit may be 2 μm or less.

As the solid electrolyte, one or more kinds of solid electrolytes may be used. In the case of using two or more kinds of solid electrolytes, they may be mixed together.

In the disclosed embodiments, unless otherwise noted, the average particle diameter of particles is a volume-based median diameter ($D_{50}$) measured by laser diffraction/scattering particle size distribution measurement. Also in the disclosed embodiments, the median diameter ($D_{50}$) of particles is a diameter at which, when the particle diameters of particles are arranged in ascending order, the accumulated volume of the particles is half (50%) the total volume of the particles (volume average diameter).

The content of the solid electrolyte in the solid electrolyte layer is not particularly limited.

From the viewpoint of exerting plasticity, etc., a binder for binding the solid electrolyte particles can be incorporated in the solid electrolyte layer. As the binder, examples include, but are not limited to, a binder that can be incorporated in the above-described cathode. However, the content of the binder in the solid electrolyte layer may be 5.0 mass % or less, from the viewpoint of preventing excessive aggregation of the solid electrolyte, enabling the formation of the solid electrolyte layer in which the solid electrolyte is uniformly dispersed, etc., for the purpose of easily achieving high battery power output.

The thickness of the solid electrolyte layer is not particularly limited and is appropriately controlled depending on the battery structure. It is generally 0.1 μm or more and 1 mm or less.

The solid electrolyte layer may be formed by pressure-forming a powdered material for forming the solid electrolyte layer, the material containing the solid electrolyte and, as needed, other components.

As needed, the all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is a material that is stable in electrolytes. As the material, examples include, but are not limited to, resins such as polypropylene, polyethylene and acrylic resin.

As the all-solid-state battery, examples include, but are not limited to, an all-solid-state lithium battery in which a lithium metal deposition-dissolution reaction is used as an anode reaction, an all-solid-state lithium ion battery in which intercalation of lithium in the anode active material is used as an anode reaction, an all-solid-state sodium battery, an all-solid-state magnesium battery and an all-solid-state calcium battery. The all-solid-state battery may be the all-solid-state lithium ion battery. Also, the all-solid-state battery may be a primary or secondary battery.

As the form of the all-solid-state battery, examples include, but are not limited to, a coin form, a laminate form, a cylindrical form and a square form.

The method for producing the all-solid-state battery of the disclosed embodiments, is as follows, for example. First, the solid electrolyte layer is formed by pressure-forming a powdered solid electrolyte material. Next, the cathode layer is obtained by pressure-forming the powdered cathode mix on one surface of the solid electrolyte layer. Then, the anode layer is obtained by pressure-forming the powdered anode mix on the other surface of the solid electrolyte layer. As needed, a current collector is attached to a cathode layer-solid electrolyte layer-anode layer assembly thus obtained. Finally, the assembly may be used as the all-solid-state battery.

In this case, the press pressure applied for pressure-forming the powdered solid electrolyte material, the powdered cathode mix and the powdered anode mix, is generally about 1 MPa or more and about 600 MPa or less.

The pressure applying method is not particularly limited. As the method, examples include, but are not limited to, pressing by use of a plate press machine, a roll press machine or the like.

Another example of the method for forming the all-solid-state battery of the disclosed embodiments, is as follows. First, the solid electrolyte layer is formed by pressure-forming the powdered solid electrolyte material. The cathode layer slurry is applied on one surface of the cathode current collector. The applied cathode layer slurry is dried, thereby obtaining the cathode comprising the cathode layer. Then, the anode layer slurry is applied on one surface of the anode current collector. The applied anode layer slurry is dried, thereby obtaining the anode comprising the anode layer. The solid electrolyte layer is disposed between the cathode layer and the anode layer to ensure that the cathode current collector, the cathode layer, the solid electrolyte layer, the anode layer and the anode current collector are arranged in this order, thereby obtaining the all-solid-state battery.

The production of the all-solid-state battery may be carried out in the state that moisture is removed from the system as much as possible. For example, it is thought to be effective to depressurize the inside of the system in the production steps and to replace the inside of the system by a substantially moisture-free gas (such as inert gas) in the production steps.

EXAMPLES

Example 1

[Production of Anode Layer]

All experiments and operations relating to anode layer production, were carried out in a glove box in which the atmosphere was controlled by Ar gas with a dew point of −70° C. or less.

Butyl butyrate was used as an organic solvent. The following anode layer materials were added to the organic solvent to obtain a mixture.

Anode active material: Elemental Si
Solid electrolyte: 15LiBr-10LiI-75(0.75$Li_2S$-0.25$P_2S_5$)
Electroconductive material: VGCF
Binder: PVDF-HFP
Ionic liquid: Solvated ionic liquid containing, in molar ratio, 2.0 mol of LiFSI with respect to 1 mol of tetraglyme (G4)

The materials (excluding the ionic liquid) contained in the thus-obtained anode layer, that is, the anode active material, the solid electrolyte (x), the electroconductive material and the binder, were in a ratio of 47:50:1.5:1.5 (in terms of mass %).

The percentage of the ionic liquid contained in the anode layer was such that when the total volume of spaces in the anode layer was determined as 100 volume %, the volume percentage (z) of the ionic liquid occupying the spaces was 100 volume %.

The mixture was stirred by use of an ultrasonic homogenizer to obtain an anode layer slurry.

The anode layer slurry was dried at 110° C. for two hours to produce a powdered anode mix.

Then, 50 mg of the powdered anode mix was pressed at a pressure of 1 t/$cm^2$ (≈98 MPa) in a cylindrical, insulating structure (diameter 11.28), thereby producing a first anode layer which contained the ionic liquid and which was in a pellet form. The first anode layer pellet was used as an anode.

[Measurement of Volume Percentage y (Volume %) of Spaces in Anode Layer]

A second anode layer which did not contain an ionic liquid and which was in a pellet form, was produced in the same manner as the method described above in [Production of anode layer], except that an ionic liquid was not used.

The volume percentage of spaces in the second anode layer was calculated from the mass and volume of the second anode layer pellet and the specific gravities of the materials. Then, the volume percentage of the spaces in the second anode layer was deemed as the volume percentage of the spaces in the first anode layer. The result is shown in Table 1.

[Calculation of Value A]

The value A of Example 1 was calculated by the above-mentioned formula (1), using the x, y and z values obtained above.

[Measurement of Lithium Ion Conductivity]

First, 100 mg of a solid electrolyte was disposed on both sides of the first anode layer pellet. They were pressed at a pressure of 6 t/$cm^2$ (≈588 MPa) to obtain a laminate.

The laminate was sandwiched by lithium foils and used as an evaluation cell. The thickness of the evaluation cell was measured by use of a micrometer.

The confining pressure of the evaluation cell was controlled to 1 MPa by use of a torque wrench. In a thermostatic bath at 25° C., a voltage of 0.1 V was applied to the evaluation cell by use of VMP3 (product name, manufactured by Bio-Logic SAS). The current amount of the evaluation cell was measured every predetermined time. The lithium ion conductivity of the first anode layer included in the evaluation cell, was calculated from the current value after 300 seconds.

The lithium ion conductivity of the second anode layer was measured by the same method as the first anode layer.

Also, "Li salt concentration" shown in Table 1 is the molar ratio of the lithium salt with respect to 1 mol of the tetraglyme.

Also, "Conductivity change rate" shown in Table 2 is the change rate of the lithium ion conductivity of the first anode layer containing the ionic liquid, with respect to the lithium ion conductivity of the second anode layer not containing an ionic liquid. The conductivity change rate can be calculated by the following formula.

Conductivity change rate (%)=(Lithium ion conductivity of the first anode layer/Lithium ion conductivity of the second anode layer)×100

Examples 2 to 13 and Comparative Example 1

The first anode layer was produced in the same manner as Example 1, except that the concentration of the lithium salt (LiFSI), the percentage (mass %) of the elemental Si contained in the first anode layer, the percentage x (mass %) of the solid electrolyte (SE) contained in the first anode layer, the volume percentage y (volume %) of the spaces present in the first anode layer, and the volume percentage z (volume %) of the ionic liquid occupying the spaces when the total volume of the spaces was determined as 100 volume %, were changed as shown in Table 1.

The second anode layer was produced in the same manner as Example 1, except that the percentage (mass %) of the elemental Si contained in the second anode layer, the percentage x (mass %) of the solid electrolyte (SE) contained in the second anode layer, and the volume percentage y (volume %) of the spaces present in the second anode layer, were changed as shown in Table 1.

Also, the lithium ion conductivity of the first and second anode layers were measured in the same manner as Example 1, except that the confining pressure (MPa) of the evaluation cell during the lithium ion conductivity measurement, was changed as shown in Table 2. Also, the percentage of the electroconductive material and binder contained in the anode layers are the same as Example 1.

TABLE 1

|  | Type of Li salt | Li salt concentration | Si (mass %) | x (Mass %) of SE | y (Volume %) of spaces | z (Volume %) of ionic liquid |
|---|---|---|---|---|---|---|
| Example 1 | LiFSI | 2.0 | 47 | 50 | 15 | 100 |
| Example 2 | LiFSI | 2.0 | 47 | 50 | 15 | 50 |
| Example 3 | LiFSI | 2.0 | 47 | 50 | 10 | 100 |
| Example 4 | LiFSI | 2.0 | 47 | 50 | 10 | 50 |
| Example 5 | LiFSI | 2.0 | 67 | 30 | 15 | 100 |
| Example 6 | LiFSI | 2.0 | 67 | 30 | 15 | 50 |
| Example 7 | LiFSI | 2.0 | 67 | 30 | 10 | 100 |
| Example 8 | LiFSI | 2.0 | 67 | 30 | 10 | 50 |
| Example 9 | LiFSI | 2.0 | 87 | 10 | 15 | 100 |
| Example 10 | LiFSI | 2.0 | 87 | 10 | 15 | 50 |
| Example 11 | LiFSI | 2.0 | 87 | 10 | 10 | 100 |
| Example 12 | LiFSI | 2.0 | 87 | 10 | 10 | 50 |
| Example 13 | LiFSI | 1.5 | 87 | 10 | 10 | 100 |
| Comparative Example 1 | LiFSI | 1.0 | 87 | 10 | 10 | 100 |

TABLE 2

|  | Confining pressure (MPa) | Li ion conductivity ($\times 10^{-4}$ S·cm) of second anode layer | Li ion conductivity ($\times 10^{-4}$ S·cm) of first anode layer | Conductivity change rate (%) | A |
|---|---|---|---|---|---|
| Example 1 | 1 | 1.292 | 1.263 | 98 | 42.5 |
| Example 2 | 1 | 1.292 | 1.099 | 85 | 85.0 |
| Example 3 | 20 | 2.362 | 2.335 | 99 | 45.0 |
| Example 4 | 20 | 2.362 | 2.298 | 97 | 90.0 |
| Example 5 | 1 | 0.598 | 1.190 | 199 | 25.5 |
| Example 6 | 1 | 0.598 | 0.588 | 98 | 51.0 |
| Example 7 | 20 | 0.783 | 1.119 | 143 | 27.0 |
| Example 8 | 20 | 0.783 | 0.774 | 99 | 54.0 |
| Example 9 | 1 | 0.181 | 1.295 | 715 | 8.5 |
| Example 10 | 1 | 0.181 | 0.703 | 388 | 17.0 |
| Example 11 | 20 | 0.214 | 1.562 | 730 | 9.0 |
| Example 12 | 20 | 0.214 | 0.658 | 307 | 18.0 |
| Example 13 | 20 | 0.214 | 0.556 | 260 | 9.0 |
| Comparative Example 1 | 20 | 0.214 | 0.132 | 62 | 9.0 |

Examples 14 to 19 and Comparative Examples 2 and 3

The first anode layer was produced in the same manner as Example 1, except that LiTFSI was used as the lithium salt in place of LiFSI, and the percentage (mass %) of the elemental Si contained in the first anode layer, the percentage x (mass %) of the solid electrolyte (SE) contained in the first anode layer, the volume percentage y (volume %) of the spaces present in the first anode layer, and the volume percentage z (volume %) of the ionic liquid occupying the spaces when the total volume of the spaces was determined as 100 volume %, were changed as shown in Table 3.

The second anode layer was produced in the same manner as Example 1, except that the percentage (mass %) of the elemental Si contained in the second anode layer, the percentage x (mass %) of the solid electrolyte (SE) contained in the second anode layer, and the volume percentage y (volume %) of the spaces present in the second anode layer, were changed as shown in Table 3.

Also, the lithium ion conductivity of the first and second anode layers were measured in the same manner as Example 1, except that the confining pressure (MPa) of the evaluation cell during the lithium ion conductivity measurement, was changed as shown in Table 4. Also, the percentage of the electroconductive material and binder contained in the anode layers are the same as Example 1.

The results are shown in Tables 3 and 4.

Also, "Li salt concentration" shown in Table 3 is the molar ratio of the lithium salt with respect to 1 mol of the tetraglyme.

Also, "Conductivity change rate" shown in Table 4 is the change rate of the lithium ion conductivity of the first anode layer containing the ionic liquid, with respect to the lithium ion conductivity of the second anode layer not containing an ionic liquid.

TABLE 3

|  | Type of Li salt | Li salt concentration | Si (mass %) | x (Mass %) of SE | y (Volume %) of spaces | z (Volume %) of ionic liquid |
|---|---|---|---|---|---|---|
| Example 14 | LiTFSI | 2.0 | 47 | 50 | 10 | 100 |
| Example 15 | LiTFSI | 2.0 | 47 | 50 | 10 | 50 |
| Example 16 | LiTFSI | 2.0 | 67 | 30 | 10 | 100 |
| Example 17 | LiTFSI | 2.0 | 87 | 10 | 15 | 100 |
| Example 18 | LiTFSI | 2.0 | 87 | 10 | 10 | 100 |
| Example 19 | LiTFSI | 2.0 | 87 | 10 | 10 | 50 |
| Comparative Example 2 | LiTFSI | 1.5 | 87 | 10 | 10 | 100 |
| Comparative Example 3 | LiTFSI | 1.0 | 87 | 10 | 10 | 100 |

TABLE 4

|  | Confining pressure (MPa) | Li ion conductivity ($\times 10^{-4}$ S · cm) of second anode layer | Li ion conductivity ($\times 10^{-4}$ S · cm) of first anode layer | Conductivity change rate (%) | A |
|---|---|---|---|---|---|
| Example 14 | 20 | 2.362 | 2.265 | 96 | 45.0 |
| Example 15 | 20 | 2.362 | 2.312 | 98 | 90.0 |
| Example 16 | 20 | 0.783 | 0.866 | 111 | 27.0 |
| Example 17 | 1 | 0.181 | 0.673 | 372 | 8.5 |
| Example 18 | 20 | 0.214 | 0.724 | 338 | 9.0 |
| Example 19 | 20 | 0.214 | 0.341 | 159 | 18.0 |
| Comparative Example 2 | 20 | 0.214 | 0.192 | 90 | 9.0 |
| Comparative Example 3 | 20 | 0.214 | 0.121 | 57 | 9.0 |

[Relationship Between Lithium Salt Concentration and Lithium Ion Conductivity]

Figure 2:
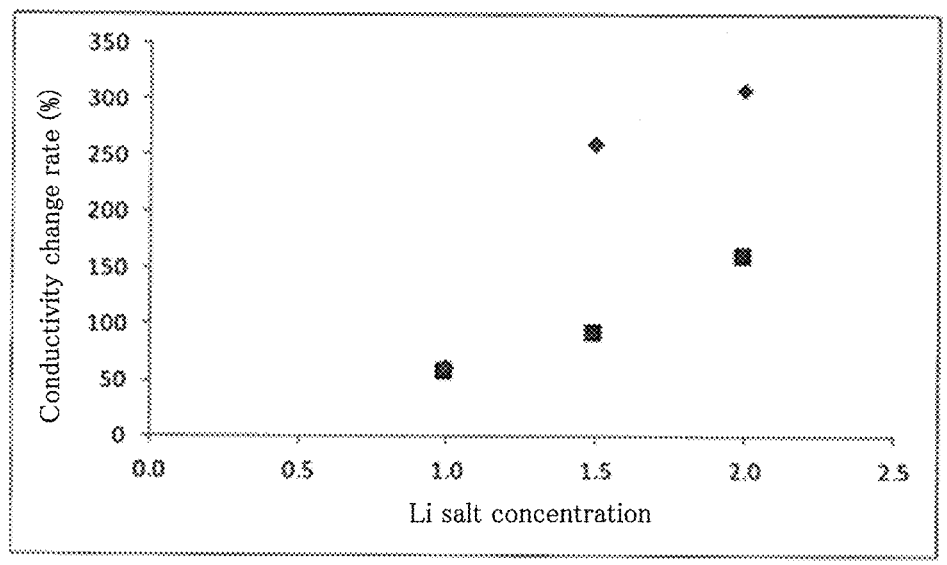
FIG. 2 is a view showing a relationship between Li salt concentration and conductivity change rate.

FIG. 2 is a view showing a relationship between the Li salt concentration and conductivity change rate of the anode layers of Examples 12, 13 and 19 and Comparative Examples 1 to 3. In FIG. 2, the anode layer in which the LiFSI-containing ionic liquid was used, is indicated as a rhombus, and the anode layer in which the LiTFSI-containing ionic liquid was used, is indicated as a square.

From Examples 1 to 13 and Comparative Example 1, it was proved that the lithium ion conductivity is increased by using, as an anode layer material, the ionic liquid in which 1.5 mol or more of LiFSI is used as the lithium salt. The reason is considered as follows: as long as the LiFSI concentration of the ionic liquid is 1.5 mol or more, all of the polar sites of the tetraglyme, which are coordinated to the lithium salt, are used for lithium coordination, thereby suppressing a reaction between the tetraglyme and the solid electrolyte.

From Examples 14 to 19, it was proved that the lithium ion conductivity is increased by using, as an anode layer material, the ionic liquid in which 2.0 mol or more of LiTFSI is used as the lithium salt. The reason is considered as follows: as long as the LiTFSI concentration of the ionic liquid is 2.0 mol or more, all of the polar sites of the tetraglyme, which are coordinated to the lithium salt, are used for lithium coordination, thereby suppressing a reaction between the tetraglyme and the solid electrolyte.

[Relationship Between Lithium Ion Conductivity and Composition of Anode Layer]

Figure 3:
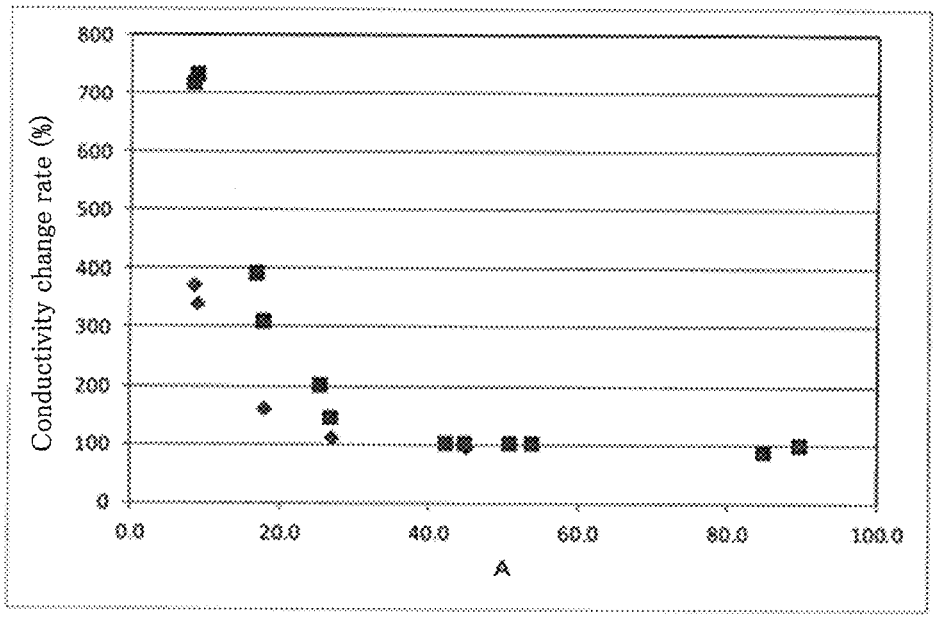
FIG. 3 is a view showing a relationship between the value A and conductivity change rate of anode layers in each of which an ionic liquid containing 2.0 mol of a lithium salt is used.

FIG. 3 is a view showing a relationship between the value A and conductivity change rate of the anode layers of Examples 1 to 12 and 14 to 19, in each of which the ionic liquid containing 2.0 mol of the lithium salt was used. In FIG. 3, the anode layer in which the LiFSI-containing ionic liquid was used, is indicated as a square, and the anode layer in which the LiTFSI-containing ionic liquid, is indicated as a rhombus.

From Examples 5, 7, 9 to 13 and 16 to 19, it was found that the lithium ion conductivity is further increased by using, as an anode layer material, the ionic liquid that contains 1.5 mol or more of LiFSI as the lithium salt, or the ionic liquid that contains 2.0 mol or more of LiTFSI as the lithium salt, and as long as the value A is 27.0 or less. The reason is considered as follows. If the value A is more than 27.0, the lithium ion conductivity of the anode layer is larger than that of the ionic liquid. Accordingly, the effects that are obtainable by using the ionic liquid, are less likely to be obtained.

REFERENCE SIGNS LIST

11. Solid electrolyte layer
12. Cathode layer
13. Anode layer
14. Cathode current collector
15. Anode current collector
16. Cathode
17. Anode
100. All-solid-state battery

The invention claimed is:

1. An anode,
wherein the anode is an anode comprising an anode layer for all-solid-state batteries;
wherein the anode layer comprises an anode active material, a solid electrolyte and an ionic liquid;
wherein the anode layer comprises at least one Si-based material selected from the group consisting of elemental Si and Si alloy as the anode active material;
wherein the ionic liquid is a solvated ionic liquid containing, in molar ratio, 1.5 mol or more of lithium bis(fluorosulfonyl)imide with respect to 1 mol of tetraglyme, or the ionic liquid is a solvated ionic liquid containing, in molar ratio, 2.0 mol or more of lithium bis(trifluoromethanesulfonyl)imide with respect to 1 mol of tetraglyme;
wherein the anode layer has spaces inside, and the ionic liquid is present in the spaces; and
wherein a value A calculated by the following formula (1) is 8.5 or more and 27.0 or less:

Formula (1)

$$A = x(100-y)/z \qquad \text{Formula (1)}$$

where x (mass %) is a mass percentage of the solid electrolyte contained in the anode layer, when a total mass of the anode layer is determined as 100 mass %; y (volume %) is a volume percentage of the spaces present in the anode layer, when a total volume of the anode layer is determined as 100 volume %; and z (volume %) is a volume percentage of the ionic liquid occupying the spaces, when a total volume of the spaces is determined as 100 volume %.

2. An all-solid-state battery comprising a cathode, the anode defined by claim 1, and a solid electrolyte layer disposed between the cathode and the anode.

3. The anode according to claim 1,
wherein the solid electrolyte is a sulfide-based solid electrolyte.

4. The anode according to claim 1,
wherein the solid electrolyte is a sulfide-based solid electrolyte; and
wherein the sulfide-based solid electrolyte is LiX—Li$_2$S—P$_2$S$_5$.

5. The anode according to claim 1,
wherein the solid electrolyte is a sulfide-based solid electrolyte; and
wherein the sulfide-based solid electrolyte is LiBr—LiI—Li$_2$S—P$_2$S$_5$.

6. An all-solid-state battery comprising a cathode, the anode defined by claim 3, and a solid electrolyte layer disposed between the cathode and the anode.

7. An all-solid-state battery comprising a cathode, the anode defined by claim 4, and a solid electrolyte layer disposed between the cathode and the anode.

8. An all-solid-state battery comprising a cathode, the anode defined by claim 5, and a solid electrolyte layer disposed between the cathode and the anode.

* * * * *